(12) United States Patent
Duan et al.

(10) Patent No.: US 11,674,386 B2
(45) Date of Patent: Jun. 13, 2023

(54) LOGGING ENCAPSULATED OPTICAL-FIBER DUCT CABLE AND MANUFACTURING METHOD THEREOF

(71) Applicant: Shinda (Tangshan) Creative Oil & Gas Equipment Co., Ltd., Hebei (CN)

(72) Inventors: Jianliang Duan, Hebei (CN); Jian Dong, Hebei (CN); Zhikun Liu, Hebei (CN); Yali Zhang, Hebei (CN); Xiang Liu, Hebei (CN); Yueqing Lin, Hebei (CN)

(73) Assignee: SHINDA(TANGSHAN) CREATIVE OIL & GAS EQUIPMENT CO., LTD., Hebei (CN)

( * ) Notice: Subject to any disclaimer, the term of this patent is extended or adjusted under 35 U.S.C. 154(b) by 0 days.

(21) Appl. No.: 17/031,528

(22) Filed: Sep. 24, 2020

(65) Prior Publication Data

US 2021/0355820 A1    Nov. 18, 2021

(30) Foreign Application Priority Data

May 12, 2020   (CN) .......................... 202010397036.3

(51) Int. Cl.
  *G02B 6/44*   (2006.01)
  *E21B 47/135*   (2012.01)
  *E21B 17/20*   (2006.01)

(52) U.S. Cl.
  CPC .......... *E21B 47/135* (2020.05); *E21B 17/206* (2013.01); *G02B 6/443* (2013.01); *G02B 6/4463* (2013.01)

(58) Field of Classification Search
  None
  See application file for complete search history.

(56) References Cited

U.S. PATENT DOCUMENTS

| 4,890,898 A | * | 1/1990 | Bentley | ................ | G01K 17/003 |
| | | | | | 374/E17.002 |
| 5,029,974 A | * | 7/1991 | Nilsson | ................ | G02B 6/4495 |
| | | | | | 385/113 |

(Continued)

FOREIGN PATENT DOCUMENTS

WO   WO-2008151322 A1 * 12/2008   ............. H01B 7/292

*Primary Examiner* — Chris H Chu
(74) *Attorney, Agent, or Firm* — Schmeiser, Olsen & Walls, LLP

(57) ABSTRACT

The present invention discloses a logging encapsulated optical-fiber duct cable and a manufacturing method thereof. The encapsulated optical-fiber duct cable mainly comprises an external encapsulation layer. At least one armor tube is arranged in the encapsulation layer. An optical fiber protective tube is arranged in each armor tube. A filling layer is arranged in a space between the optical fiber protective tube and the armor tube. An optical fiber is arranged in the optical fiber protective tube. The manufacturing method mainly comprises four steps: pavement of the optical fiber and formation of the protective tube, formation of the filling layer, formation of the armor tube and formation of the encapsulation layer. The optical-fiber duct cable of the present invention has the advantages of large length, high strength, good temperature tolerance, small signal transmission loss, high transmission speed and synchronous transmission of multiple signals.

2 Claims, 7 Drawing Sheets

(56) References Cited

U.S. PATENT DOCUMENTS

| | | | | |
|---|---|---|---|---|
| 9,442,263 | B1* | 9/2016 | Cheatle | G02B 6/443 |
| 10,018,796 | B1* | 7/2018 | Cook | G02B 6/443 |
| 11,250,972 | B1* | 2/2022 | Evans | H01B 1/16 |
| 2002/0136511 | A1* | 9/2002 | Cecchi | G02B 6/4427 |
| | | | | 385/109 |
| 2007/0098339 | A1* | 5/2007 | Bringuier | G02B 6/02357 |
| | | | | 385/106 |
| 2015/0104140 | A1* | 4/2015 | Wang | G02B 6/0281 |
| | | | | 385/124 |
| 2015/0110451 | A1* | 4/2015 | Blazer | G02B 6/4432 |
| | | | | 385/103 |
| 2015/0184469 | A1* | 7/2015 | Sherman | H01B 7/0241 |
| | | | | 385/101 |
| 2016/0290835 | A1* | 10/2016 | McCoy | E21B 17/1035 |
| 2019/0113703 | A1* | 4/2019 | Cook | G02B 6/4403 |
| 2019/0212516 | A1* | 7/2019 | Taverner | G02B 6/4427 |

* cited by examiner

LOGGING ENCAPSULATED OPTICAL-FIBER DUCT CABLE AND MANUFACTURING METHOD THEREOF

TECHNICAL FIELD

The present invention relates to the field of petroleum engineering, and in particular to a logging encapsulated optical-fiber duct cable and a manufacturing method thereof.

BACKGROUND

A logging cable can be applied to not only operations of logging, perforating, coring and the like of various oil and gas wells, but also hydraulic and hydrologic survey, coal-field geological exploration, geothermal logging and the like. It is a connection line utilized as load-bearing connection between the ground system and underground instruments and utilized for transmitting survey data. However, the existing logging cable generally transmits electrical signals through metal conductors. The transmission speed is low, and the amount of information is small; so, the existing logging cable cannot be applied to complex working conditions.

SUMMARY

The objective of the present invention is to provide a logging encapsulated optical-fiber duct cable to solve the problem: the logging cable generally transmits electrical signals through metal conductors; the transmission speed is low, and the amount of information is small; so, the logging cable cannot be applied to complex working conditions.

To solve the above-mentioned technical problem, the present invention adopts the following technical solution:

A logging encapsulated optical-fiber duct cable of the present invention comprises an external encapsulation layer. At least one armor tube is arranged in the encapsulation layer. An optical fiber protective tube is arranged in each armor tube. A filling layer is arranged in a space between the optical fiber protective tube and the armor tube. An optical fiber is arranged in the optical fiber protective tube.

Further, the encapsulation layer is made from thermoplastic vulcanizate (TPV), polypropylene (PP), fluorinated ethylene propylene (FEP), or polyvinylidene fluoride (PVDF) thermoplastic materials.

Further, the armor tube is made of a 316L, 825 or 2205 stainless steel welded tube.

Further, the optical fiber protective tube is made of a 316L or 825 stainless steel welded tube.

Further, the optical fiber comprises a high temperature coating. At least one core is arranged in the high temperature coating. Each core is coated with a quartz cladding.

Further, the encapsulation layer is further provided with reinforcing ribs or an oil tube. Further, the filling layer is formed by an aluminum tube or a mica tape.

A manufacturing method of a logging encapsulated optical-fiber duct cable comprises the following steps:

step 1: pavement of an optical fiber and formation of a protective tube: respectively placing a steel coil raw material for producing the optical fiber protective tube and a wound optical fiber on relative winding devices; guiding the start end of the steel coil raw material for producing the optical fiber protective tube to sequentially pass through a steel tube initial forming device, an optical fiber winding device, a laser welding device, a nondestructive testing device, a steel tube drawing device and a traction device to produce the optical fiber protective tube; winding the optical fiber protective tube by an optical fiber protective tube winding device;

step 2: formation of a filling layer:

when the filling layer is formed by an aluminum tube, respectively placing an aluminum coil raw material for producing the filling layer and the wound optical fiber protective tube on relative winding devices; guiding the start end of the aluminum coil raw material for producing the filling layer to sequentially pass through an aluminum tube initial forming device, an optical fiber protective tube winding device, a laser welding device, a tube diameter finishing device and a traction device to produce the aluminum tube; winding the aluminum tube by a winding device;

step 3: formation of an armor tube: placing a steel coil raw material for producing the armor tube and the aluminum tube on relative winding devices; coating the filling layer with the armor tube by the devices in step 1; winding the filling layer coated with the armor tube by the winding device;

step 4: formation of an encapsulation layer: placing the armor tube to be encapsulated on a relative winding device, guiding the start end of the armor tube to sequentially pass through a straightening device, a preheating device, an encapsulation and extrusion device, a cooling device and a traction device to form the encapsulation layer; winding the encapsulated optical-fiber duct cable by the winding device.

Further, a mica tape wraps around the optical fiber protective tube through the winding device when the filling layer is formed by the mica tape.

Compared with the prior art, the present invention has the following beneficial effects:

The encapsulation layer of the present invention improves the corrosion resistance of the armor tube. The armor tube is used for protecting the internal optical fiber from the external mechanical force to withdraw the pressure. The filling layer is mainly used for connecting the optical fiber protective tube with the external armor tube to greatly protect the internal optical fiber and prevent the internal optical fiber from being damaged in the external armor tube welding process. The optical-fiber duct cable of the present invention has the advantages of large length, high strength, good temperature tolerance, small signal transmission loss, high transmission speed and synchronous transmission of multiple signals.

BRIEF DESCRIPTION OF THE DRAWINGS

The present invention is further described below with reference to the accompanying drawings.

Description of reference signs: 1-encapsulation layer, 2-armor tube, 3-optical fiber protective tube, 4-filling layer, 5-optical fiber, 501-high temperature coating, 502-quartz cladding, 503-core, 6-reinforcing rib, and 7-oil tube.

DESCRIPTION OF THE EMBODIMENTS

To enable a person skilled in the art to better understand the present invention, the present invention is further described below in detail with reference to the accompanying drawings and specific embodiments.

Embodiment 1

Figure 1:
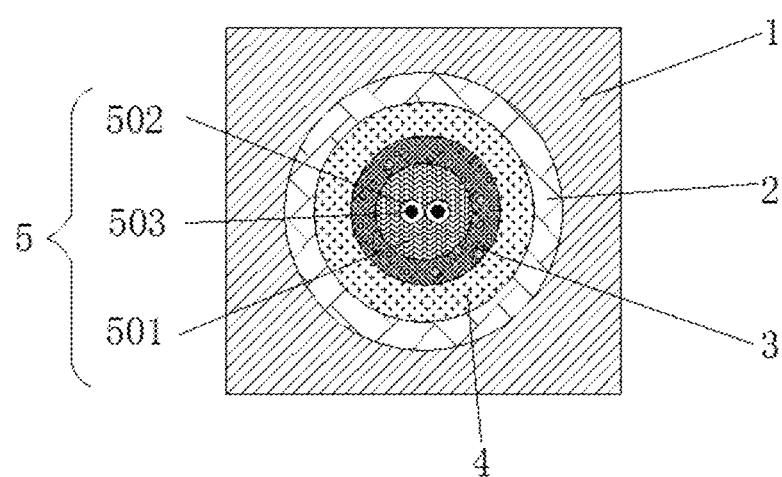
FIG. 1 is a schematic structural diagram of a logging encapsulated optical-fiber duct cable in Embodiment 1 of the present invention.

As shown in FIG. 1, the embodiment discloses a logging encapsulated optical-fiber duct cable, comprising an external encapsulation layer 1. At least one armor tube 2 is arranged in the encapsulation layer 1. In the embodiment, only one armor tube 2 is arranged. An optical fiber protective tube 3 is arranged in the armor tube 2. A filling layer 4 is arranged in a space between the optical fiber protective tube 3 and the armor tube 2. An optical fiber 5 is arranged in the optical fiber protective tube 3.

The encapsulation layer 1 is formed by various nonmetal materials and is used for protecting the armor tube 2. It is made from materials resisting oil, corrosion and high temperature. The encapsulation layer 1 may be made from thermoplastic materials such as thermoplastic vulcanizate (TPV), polypropylene (PP), fluorinated ethylene propylene (FEP), polyvinylidene fluoride (PVDF) and the like.

The armor tube 2 is used for protecting the internal optical fiber from the external mechanical force to withdraw the pressure. The armor tube 2 is made of a 316L, 825 or 2205 stainless steel welded tube.

The optical fiber protective tube 3 is made of a 316L or 825 stainless steel welded tube. The optical fiber protective tube 3 protects the weak optical fiber and achieves a buffering function to a certain extent.

The filling layer 4 is mainly used for connecting the optical fiber protective tube 3 with the external armor tube 2 to greatly protect the internal optical fiber and prevent the internal optical fiber from being damaged in the external armor tube 2 welding process. The filling layer 4 is formed by an aluminum tube or a mica tape.

In the embodiment, the optical fiber 5 comprises a high temperature coating 501. At least one core 503 is arranged in the high temperature coating 501. Each core 503 is coated with a quartz cladding 502. The high temperature coating 501 may select a high-temperature acrylate coating or a polyimide coating.

Figure 2:
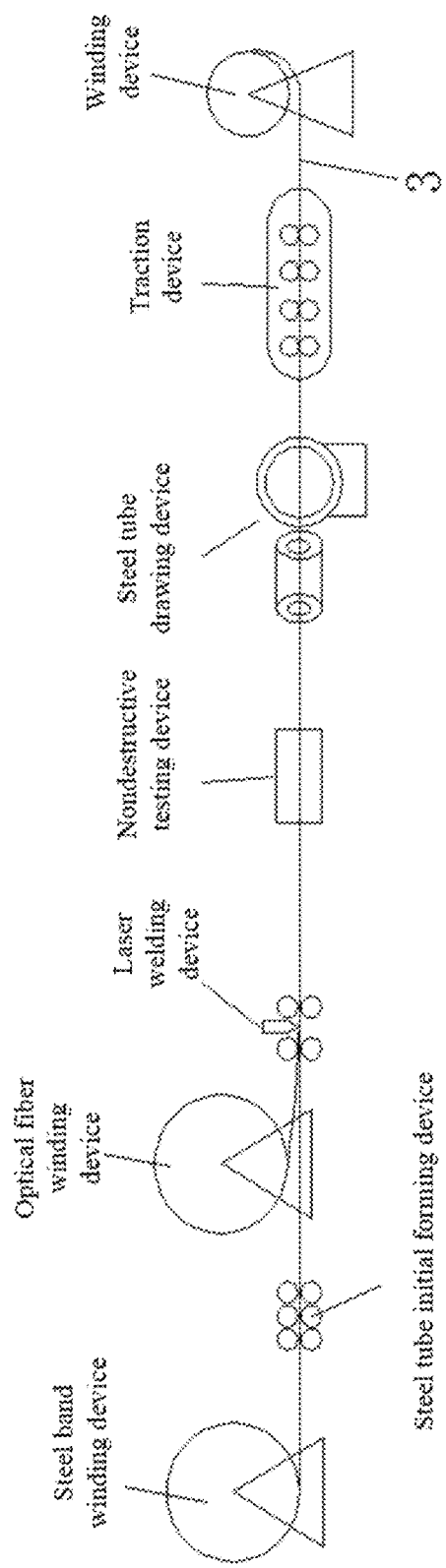
FIG. 2 is a flowchart of pavement of an optical fiber and formation of a protective tube in Embodiment 1 of the present invention.

As shown in FIG. 2 to FIG. 5, a manufacturing method of a logging encapsulated optical-fiber duct cable comprises the following steps:

As shown in FIG. 2, pavement of an optical fiber and formation of a protective tube specifically is: respectively placing a steel coil raw material for producing the optical fiber protective tube 3 and a wound optical fiber 5 on relative winding devices; guiding the start end of the steel coil raw material for producing the optical fiber protective tube 3 to sequentially pass through a steel tube initial forming device, an optical fiber winding device, a laser welding device, a nondestructive testing device, a steel tube drawing device and a traction device to produce the optical fiber protective tube 3; winding the optical fiber protective tube 3 by an optical fiber protective tube winding device.

The steel band is made in a U shape by the steel tube initial forming device. The optical fiber 5 is placed into the optical fiber protective tube 3 through an U-shaped opening under the action of the winding device. In the placing process, the optical fiber needs to pass through a guide wheel. The guide wheel presses the optical fiber 5 to approach the bottom surface of the optical fiber protective tube 3 so as to prevent the optical fiber 5 from being damaged by high temperature of laser welding. The laser welding device is used for welding an abutting slot of the optical fiber protective tube 3. The nondestructive testing device conducts the nondestructive test on the welded optical fiber protective tube 3 by using eddies.

After the optical fiber protective tube 3 is initially formed, its start end passes through the steel tube drawing device such that its tube diameter is changed. At this time, the steel tube drawing device stops, the start end of the optical fiber 5 is placed in the initial formed optical fiber protective tube 3. Then, the optical fiber 5 is manually conveyed forwards till the start end of the optical fiber 5 props against a shrunk position of the optical fiber protective tube 3. The shrunk position of the optical fiber protective tube 3 clamps the optical fiber 5. At this time, the steel tube drawing device starts. The optical fiber 5 follows the optical fiber protective tube 3 to be drawn to move forwards.

Figure 3:
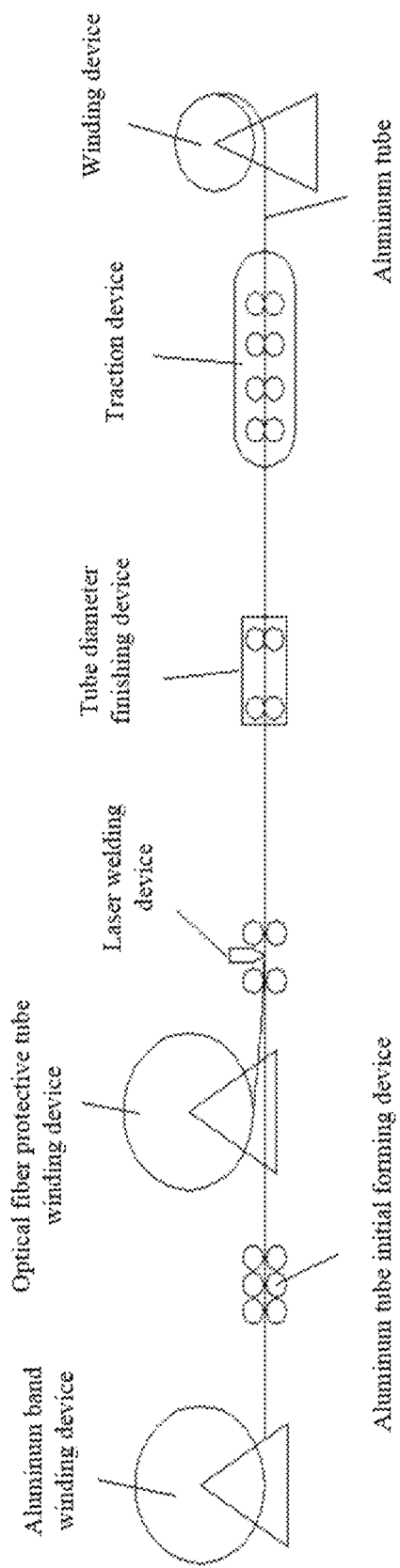
FIG. 3 is a flowchart of formation of a filling layer in Embodiment 1 of the present invention.

As shown in FIG. 3, formation of a filling layer specifically is: when the filling layer 4 is formed by an aluminum tube, respectively placing an aluminum coil raw material for producing the filling layer 4 and the wound optical fiber protective tube 3 on relative winding devices; guiding the start end of the aluminum coil raw material for producing the filling layer 4 to sequentially pass through an aluminum tube initial forming device, an optical fiber protective tube winding device, a laser welding device, a tube diameter finishing device and a traction device to produce the aluminum tube; winding the aluminum tube by a winding device. In the embodiment, the aluminum tube is the filling layer 4.

Figure 4:
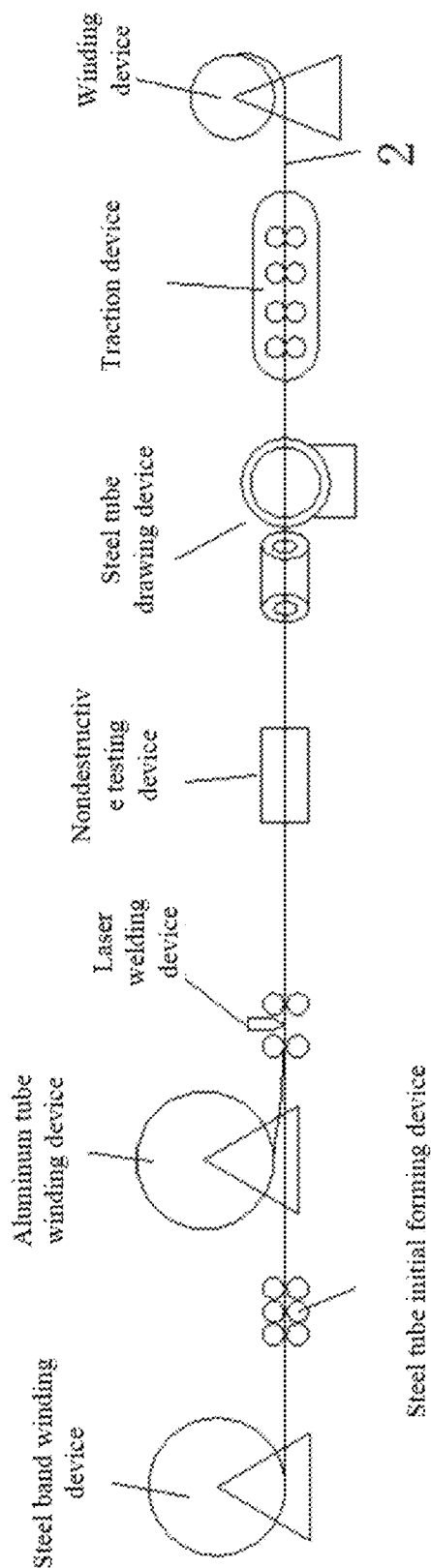
FIG. 4 is a flowchart of formation of an armor tube in Embodiment 1 of the present invention.

As shown in FIG. 4, formation of an armor tube specifically is: placing a steel coil raw material for producing the armor tube 2 on the relative winding device; placing the optical fiber protective tube 3 coated with the filling layer 4 on the winding device; coating the filling layer 4 with the armor tube 2 by the devices in step 1; winding the filling layer coated with the armor tube by the winding device.

Figure 5:
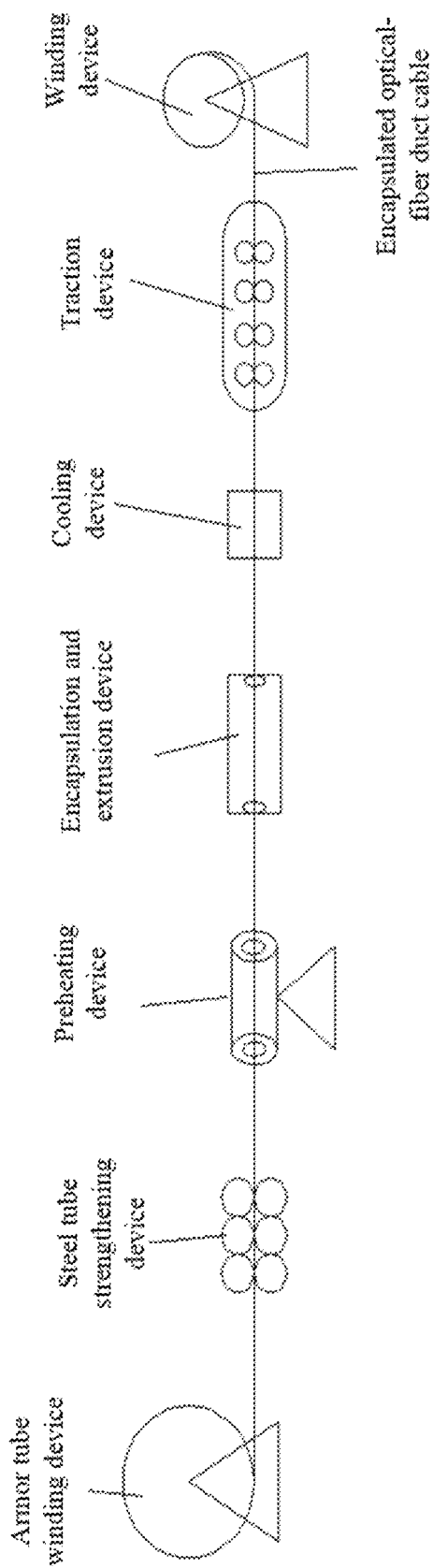
FIG. 5 is a flowchart of formation of an encapsulation layer in Embodiment 1 of the present invention.

As shown in FIG. 5, formation of an encapsulation layer specifically is: placing the armor tube 2 to be encapsulated on a relative winding device, guiding the start end of the armor tube 2 to sequentially pass through a straightening device, a preheating device, an encapsulation and extrusion device, a cooling device and a traction device to form the encapsulation layer 1; winding the encapsulated optical-fiber duct cable by the winding device.

It should be noted that the steel band, the optical fiber and the duct cable winding devices are used for placing the raw materials, the semi-finished products and the finished products and also paying off or winding up the materials. The drawing device draws the steel tube to the desired size by using a preset specification of mold. The drawing force is provided by a drawing gear device. The traction device provides the traction force for movement of the steel tube.

In the embodiment, the steel tube initial forming device adopts the stainless steel tube making machine produced by Guangzhou Yangcheng Machinery Manufacture Co., Ltd.

The laser welding device is produced by United Winners Laser Co., Ltd. In Shenzhen. The above manufacturing devices belong to the prior art, and those skilled in the art can buy the existing manufacturing devices on the market. These devices are not described herein.

Embodiment 2

Figure 6:
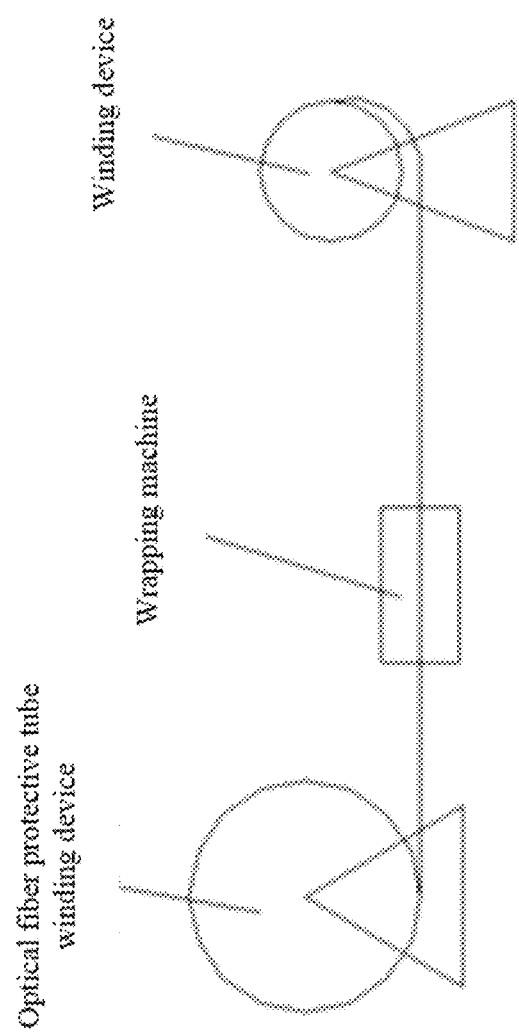
FIG. 6 is a flowchart of formation of a filling layer by utilizing a mica tape in Embodiment 3 of the present invention.

As shown in FIG. 6, a manufacturing method of a logging encapsulated optical-fiber duct cable is disclosed in the embodiment and comprises: step 1, pavement of an optical fiber and formation of a protective tube; step 2, formation of a filling layer; step 3, formation of an armor tube; step 4, formation of an encapsulation layer.

In the embodiment, the filling layer 4 in the formation of the filling layer adopts a mica tape. The mica tape wraps around the optical fiber protective tube 3 through the winding device. The winding device is a wrapping machine. The other manufacturing steps are totally the same as the steps in Embodiment 1, which are not described herein.

Embodiment 3

Figure 7:
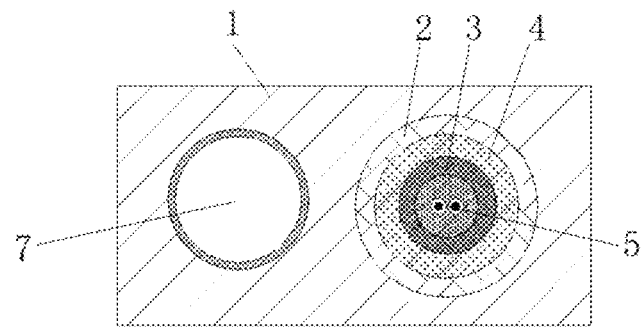
FIG. 7 is a schematic structural diagram when reinforcing ribs are disposed in an encapsulation layer in Embodiment 3 of the present invention.

As shown in FIG. 7, a logging encapsulated optical-fiber duct cable is disclosed in the embodiment and comprises an external encapsulation layer 1. An armor tube 2 is arranged in the encapsulation layer 1. An optical fiber protective tube 3 is arranged in the armor tube 2. A filling layer 4 is arranged in a space between the optical fiber protective tube 3 and the armor tube 2. An optical fiber 5 is arranged in the optical fiber protective tube 3. The structure of the optical fiber 5 in the embodiment is the same as the structure of the optical fiber in Embodiment 1, which is not described herein. In the embodiment, the encapsulation layer 1 is further provided with two reinforcing ribs 6 respectively located on two sides of the armor tube 2. The reinforcing ribs 6 may utilize multi-strand stainless steel wire ropes.

Embodiment 4

Figure 8:
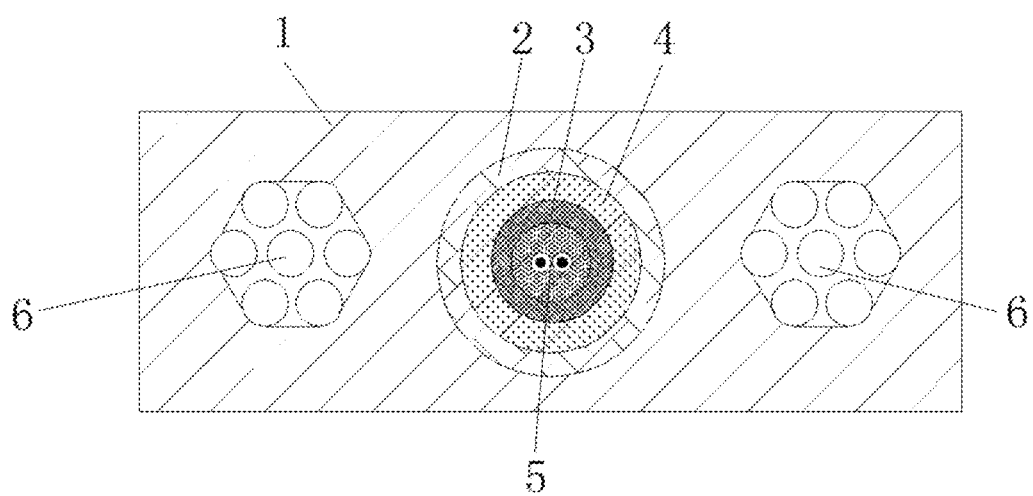
FIG. 8 is a schematic structural diagram when an oil tube is disposed in an encapsulation layer in Embodiment 4 of the present invention.

As shown in FIG. 8, a logging encapsulated optical-fiber duct cable is disclosed in the embodiment and comprises an external encapsulation layer 1. An armor tube 2 is arranged in the encapsulation layer 1. An optical fiber protective tube 3 is arranged in the armor tube 2. A filling layer 4 is arranged in a space between the optical fiber protective tube 3 and the armor tube 2. An optical fiber 5 is arranged in the optical fiber protective tube 3. The structure of the optical fiber 5 in the embodiment is the same as the structure of the optical fiber in Embodiment 1, which is not described herein.

In the embodiment, the encapsulation layer 1 is further provided with an oil tube 7. The oil tube 7 conveys the ground hydraulic oil to the mine and is communicated with a hydraulic device.

The above embodiments merely describe the preferred embodiments of the present invention and are not intended to limit the scope of the present invention. Various changes and improvements made to the technical solution of the present invention by those of ordinary skill in the art without departing from the design spirit of the present invention shall fall within the protective scope of the appended claims of the present invention.

What is claimed is:

1. A manufacturing method of a logging encapsulated optical-fiber duct cable, the logging encapsulated optical-fiber duct cable comprising an external encapsulation layer (1), wherein at least one armor tube (2) is arranged in the encapsulation layer (1); an optical fiber protective tube (3) is arranged in each armor tube (2); a filling layer (4) is arranged in a space between the optical fiber protective tube (3) and the armor tube (2); an optical fiber (5) is arranged in the optical fiber protective tube (3); wherein the encapsulation layer (1) is further provided with reinforcing ribs (6) or an oil tube (7), and the reinforcing ribs (6) are not in contact with the armor tube (2); wherein the encapsulation layer (1) is made from thermoplastic vulcanizate (TPV) thermoplastic material; the optical fiber (5) comprises a high temperature coating (501); at least one core (503) is arranged in the high temperature coating (501); each core (503) is coated with a quartz cladding (502), and the high temperature coating (501) is selected from a high-temperature acrylate coating or a polyimide coating, the manufacturing method comprising the following steps:

step 1: pavement of the optical fiber and formation of the protective tube: respectively placing a steel coil raw material for producing the optical fiber protective tube (3) and the wound optical fiber (5) on relative winding devices; guiding the start end of the steel coil raw material for producing the optical fiber protective tube (3) to sequentially pass through a steel tube initial forming device, an optical fiber winding device, a laser welding device, a nondestructive testing device, a steel tube drawing device and a traction device to produce the optical fiber protective tube (3); winding the optical fiber protective tube (3) by an optical fiber protective tube winding device;

step 2: formation of the filling layer:

when the filling layer (4) is formed by an aluminum tube, respectively placing an aluminum coil raw material for producing the filling layer (4) and the wound optical fiber protective tube (3) on relative winding devices; guiding the start end of the aluminum coil raw material for producing the filling layer (4) to sequentially pass through an aluminum tube initial forming device, an optical fiber protective tube winding device, a laser welding device, a tube diameter finishing device and a traction device to produce the aluminum tube; winding the aluminum tube by a winding device;

step 3: formation of the armor tube: placing a steel coil raw material for producing the armor tube (2) and the aluminum tube on relative winding devices; coating the filling layer (4) with the armor tube (2) by the devices in step 1; winding the filling layer coated with the armor tube by the winding device;

step 4: formation of the encapsulation layer: placing the armor tube (2) to be encapsulated on a relative winding device, guiding the start end of the armor tube (2) to sequentially pass through a straightening device, a preheating device, an encapsulation and extrusion device, a cooling device and a traction device to form the encapsulation layer (1); winding the encapsulated armor tube by the winding device.

2. The manufacturing method of the logging encapsulated optical-fiber duct cable according to claim 1, wherein a mica tape wraps around the optical fiber protective tube (3) through the winding device when the filling layer (4) is formed by the mica tape.

* * * * *